(No Model.)

W. S. GRANGER.
NAUTICAL CLEAT.

No. 533,193. Patented Jan. 29, 1895.

Witnesses:
George L. Cragg
DeWitt C. Tanner

Inventor
William S. Granger
By Boston & Brown
Attorneys

# UNITED STATES PATENT OFFICE.

WILLIAM STERLING GRANGER, OF CHICAGO, ILLINOIS.

NAUTICAL CLEAT.

SPECIFICATION forming part of Letters Patent No. 533,193, dated January 29, 1895.

Application filed December 18, 1894. Serial No. 532,195. (No model.)

*To all whom it may concern:*

Be it known that I, WILLIAM STERLING GRANGER, a citizen of the United States, residing at Chicago, in the county of Cook and State of Illinois, have invented a certain new and useful Improvement in Nautical Cleats, of which the following is a full, clear, concise, and exact description, reference being had to the accompanying drawings, forming a part of this specification.

My invention relates to nautical cleats, a cleat consisting ordinarily of a bar having two arms, and being fastened to a post or stanchion by one or more bolts or screws passing through the stem or central portion thereof. Such cleats are used for belaying the sheets and halyards.

My invention, speaking generally, consists in combining in one device a pulley block and cleat, a sheave mounted in the portion corresponding to the block serving as one side of the cleat and being adapted to turn freely upon its axis, thereby reducing the friction when a sheet is hauled in over the sheave.

My invention will be more readily understood by reference to the accompanying drawings, in which—

Figure 1:
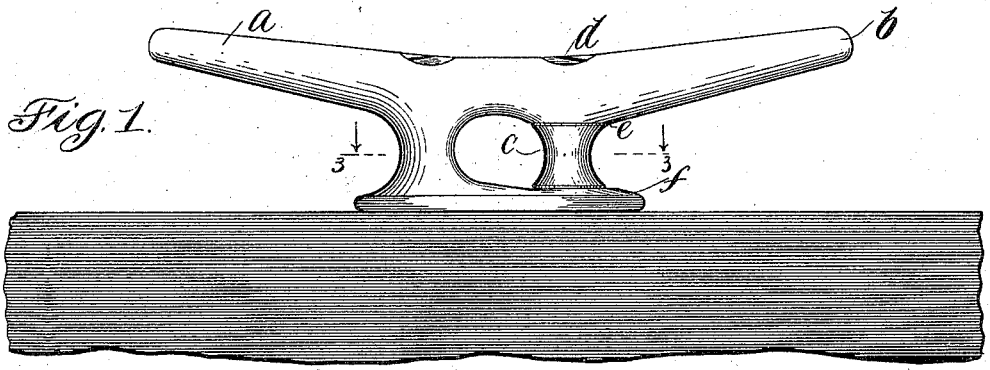
Figure 2:
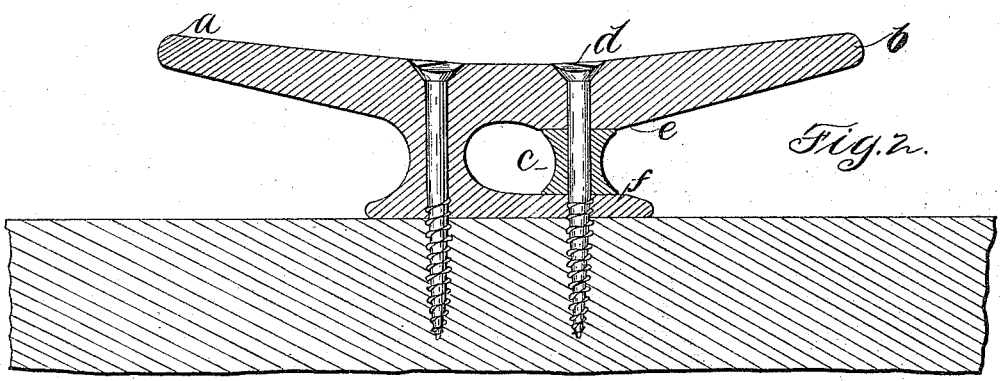
Figure 3:
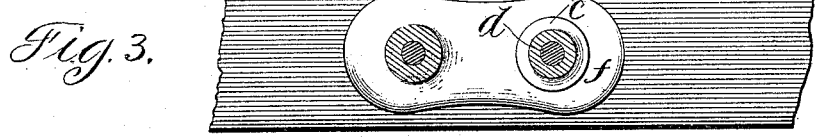

Figure 1 is a side elevation illustrative of my cleat mounted on a stanchion, rail or other support. Fig. 2 is a longitudinal, central, sectional view thereof. Fig. 3 is a plan view as seen from lines 3—3, of Fig. 1.

Like parts are indicated by similar letters of reference throughout the different figures.

The cleat is provided with two arms *a* and *b* as is usual. By means of screws passing through the central portion thereof the cleat is secured in place. Any suitable means of attachment may be employed.

The novel feature of my invention consists in providing at one side or edge of the body of the cleat a rotatably mounted anti-friction piece or sheave *c*, over which the sheets are adapted to be drawn when being hauled in or hauled aft. I preferably employ two bolts or screws for fastening the cleat to the rail, deck or stanchion. One of these, *d*, serves as the axis for the sheave *c*, which is loosely mounted so as to turn freely in the pulley block formed by the portions *e f* of the cleat. When a sheet is drawn in or aft over sheave *c* the friction of the sheet is reduced to a minimum, and when fully drawn in may be belayed to the cleat in the usual manner.

My combined cleat and sheave I have found of special utility upon yachts and craft of the small variety, upon which usually only one or two men are employed. My invention may, however, be advantageously employed wherever cleats are used as a guide or bearing surface for the sheets.

Having thus described my invention, I claim as new and desire to secure by Letters Patent—

In a cleat, the combination with the arms and the stem thereof with means for securing the same in position, of a sheave rotatably mounted between the portions *e* and *f* of the cleat and adapted to form a bearing surface or guide for the sheets, to reduce the friction thereof when hauled in or hauled aft over the same, said cleat being adapted to serve as a means of securing the sheets, substantially as and for the purpose specified.

In witness whereof I hereunto subscribe my name this 15th day of December, A. D. 1894.

WILLIAM STERLING GRANGER.

Witnesses:
DE WITT C. TANNER,
GEORGE L. CRAGG.